United States Patent
Schmidek et al.

(10) Patent No.: US 9,356,803 B2
(45) Date of Patent: May 31, 2016

(54) FIELD AWARE VIRTUAL CONNECTION DISCOVERY

(75) Inventors: Adi Schmidek, Netanya (IL); Nissim Lehyani, Tel Aviv (IL)

(73) Assignee: Cisco Technology, Inc., San Jose, CA (US)

(*) Notice: Subject to any disclaimer, the term of this patent is extended or adjusted under 35 U.S.C. 154(b) by 332 days.

(21) Appl. No.: 13/342,837

(22) Filed: Jan. 3, 2012

(65) Prior Publication Data

US 2013/0136031 A1     May 30, 2013

Related U.S. Application Data

(60) Provisional application No. 61/565,056, filed on Nov. 30, 2011.

(51) Int. Cl.
    *H04L 12/28*     (2006.01)
    *H04L 12/46*     (2006.01)
    *H04L 12/721*     (2013.01)

(52) U.S. Cl.
    CPC ........ *H04L 12/4687* (2013.01); *H04L 12/4641* (2013.01); *H04L 12/4654* (2013.01); *H04L 12/4675* (2013.01); *H04L 45/68* (2013.01); *H04L 12/2852* (2013.01)

(58) Field of Classification Search
    CPC ............ H04L 12/4687; H04L 12/4645; H04L 12/4654; H04L 12/4633; H04L 12/4641; H04L 12/4675; H04L 12/2852; H04L 41/0806; H04L 49/253; H04L 45/68; H04L 45/02; H04L 12/42852; H04L 49/351
    USPC ............... 370/356, 390, 392, 395.31, 395.32, 370/395.53, 397, 409, 230, 254; 709/238–244, 246, 223
    See application file for complete search history.

(56) References Cited

U.S. PATENT DOCUMENTS

| | | | |
|---|---|---|---|
| 7,339,929 B2* | 3/2008 | Zelig et al. ................... 370/390 |
| 7,606,939 B1* | 10/2009 | Finn .............................. 709/246 |
| 2009/0010265 A1* | 1/2009 | Vishnubhotla et al. .. 370/395.53 |
| 2009/0125617 A1* | 5/2009 | Klessig et al. ................ 709/223 |
| 2010/0246393 A1* | 9/2010 | Chamas et al. ............... 370/230 |
| 2012/0254376 A1* | 10/2012 | Bumstead ............. H04L 49/351 709/220 |

OTHER PUBLICATIONS

Building Carrier Ethernet Services Using Cisco Ethernet Virtual Circuits (EVC), Cisco Networks, 2008.*

\* cited by examiner

*Primary Examiner* — Kwang B Yao
*Assistant Examiner* — Harun Chowdhury
(74) *Attorney, Agent, or Firm* — Hickman Palermo Becker Bingham LLP

(57) ABSTRACT

A method for field aware virtual connection discovery is described. In an embodiment, a set of virtual connection domains and a set of virtual connection connectors are determined from a network. Each of the virtual connection connectors defines a connection between two or more of the virtual connection domains. An initial virtual connection connector is selected and added to a virtual connection map. A packet is generated which represents the selected virtual connection connector. The packet is flooded through the virtual connection domains and virtual connection connectors. Each virtual connection domain or virtual connection connector which the packet passes through is added to the virtual connection map. After the flooding is complete, the virtual connection map is displayed.

24 Claims, 8 Drawing Sheets

FIELD AWARE VIRTUAL CONNECTION DISCOVERY

PRIORITY CLAIM

This application claims priority to U.S. Provisional Patent Application Ser. No. 61/565,056, filed Nov. 30, 2011 entitled FIELD AWARE VIRTUAL CONNECTION DISCOVERY the contents of which are herein incorporated by reference in their entirety for all purposes.

TECHNICAL FIELD

The present disclosure generally relates to techniques for discovering Virtual Connections in a network.

BACKGROUND

In a data communication network, network elements may comprise internetworking infrastructure elements such as routers, switches, other internetworking devices, or components thereof, or end stations such as printers or general purpose computers that are typically, but not always, located at the edge of a given network. Some of the devices may be owned or operated by an Internet Service Provider (ISP) and are sometimes referred to as Service Provider Equipment (SPE). Other devices may be owned or operated by the customer using a service provided by an ISP and are sometimes referred to as Customer Equipment (CE).

In addition to network elements, a network may comprise one or more Business Elements (BE). A Business Element is a construction or organization of certain network elements and their properties into a logical entity. In some cases, the logical entity is intended to provide the ability to track the network elements in a way that makes sense from a business perspective. As an example, a virtual private network (VPN) may be viewed as a business element that represents a set of interconnected sites that appear to form a single private network over a public network. Business elements may also include virtualized components or devices in a network. The virtualized components and devices may perform operations typically associated with physical components and devices. However, the virtualized components and devices may in fact be implemented by a collection of one or more network elements which are the physical devices assisting in the operation.

In many cases customers wish to interconnect the various network and business elements that comprise their networks so that information can be transferred from one to another. However, it may not always be feasible for a customer to directly connect all the elements of their network. For example, the different segments of the customer's network may be geographically separated and it would be too expensive to run a direct line from one to another. Thus, the customer may have to resort to utilizing a service provider network in order to interconnect the remote regions of the customer's network.

However, the customer may want the different segments of their network to be able to communicate as though they were directly wired together. As a result, some service provider networks support Virtual Connections. A Virtual Connection may be defined as an association of two or more User Network Interfaces (UNIs) with connectivity between them. The UNI is the point of demarcation between the customer's network and the network of the service provider. The components which the Virtual Connection connects are sometimes referred to as the subscribers of the Virtual Connection.

The service provider network may endeavor to ensure that data originating from one subscriber is only delivered to other subscribers of the same Virtual Connection. In this fashion, a Virtual Connection may mimic a direct line between the subscribers. A service provider network may implement a Virtual Connection by means of network and business elements which define rules indicating how traffic should be routed through the network.

One particular type of Virtual Connection is an Ethernet Virtual Connection (EVC). An example of which is described by a paper published by the Metro Ethernet Forum (MEF) entitled "Metro Ethernet Services—a Technical Overview," 2006, the entire contents of which are hereby incorporated by reference for all purposes as if fully set forth herein. An EVC is a Virtual Connection that attempts to emulate an Ethernet hub or a direct Ethernet line. In an EVC, the traffic sent to and from the customer equipment consists of Ethernet frames and the EVC attempts to emulate the properties of an Ethernet Connection for traffic sent over the service provider network. The service provider network through which an EVC passes is sometimes referred to as a Metro Ethernet Network (MEN).

In some cases, a Virtual Connection may pass through network segments which implement Multi Protocol Label Switching (MPLS). MPLS is a mechanism in high-performance telecommunications networks that directs data from one network node to the next based on short path labels rather than long network addresses, avoiding complex lookups in a routing table. The labels identify virtual links between distant nodes rather than endpoints. MPLS can potentially encapsulate packets of many different network protocols. Networks which implement MPLS may associate links in the network with particular VLANs and use VLAN tags incorporated into the traffic as the labels MPLS uses to route the traffic.

DESCRIPTION OF EXAMPLE EMBODIMENTS

Figure 1:
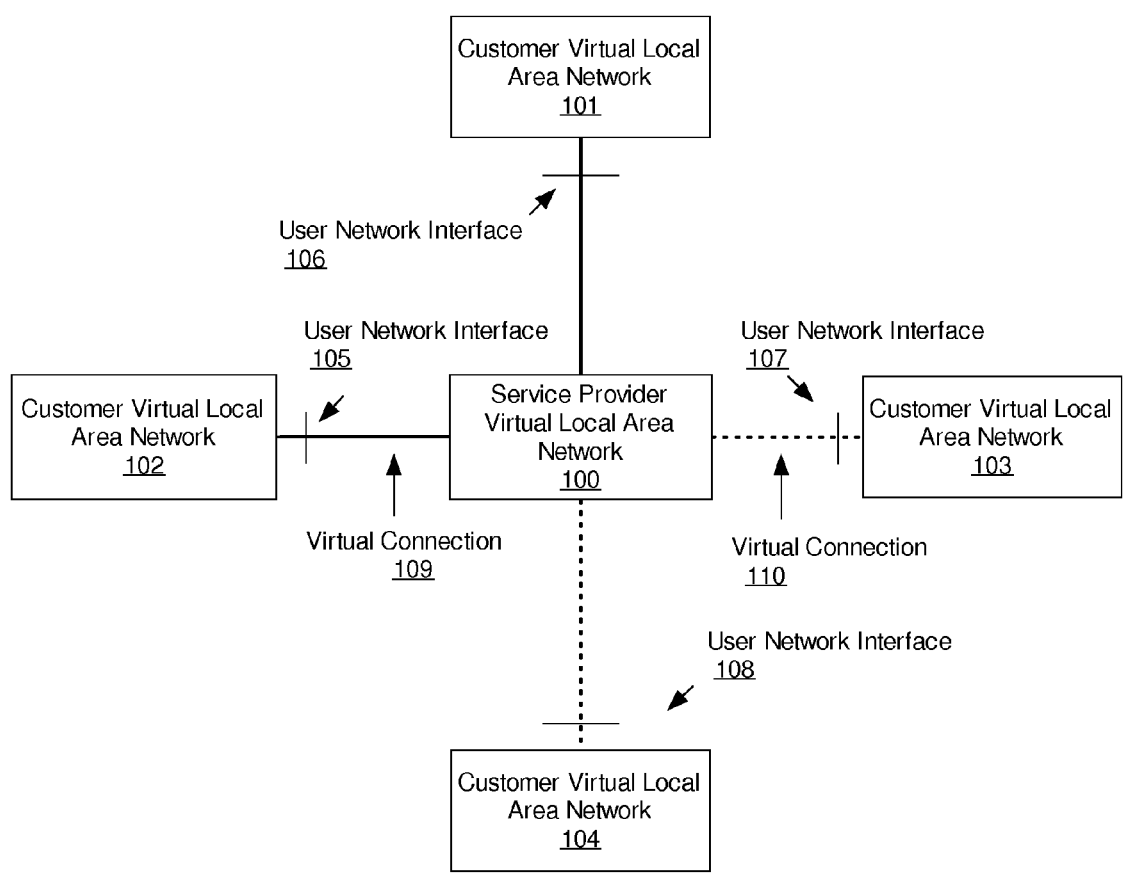
FIG. 1 illustrates an example network upon which an embodiment may discover virtual connections.

Field aware virtual connection discovery is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 Overview
2.0 Virtual Connections Overview
3.0 Virtual Connection Connectors
   3.1 Match Criteria
   3.2 Rewrite Commands
   3.3 Bi-directionality
   3.4 Example Virtual Connection Connector Components
4.0 Virtual Connection Domains
   4.1 Example Virtual Connection Domain Components
5.0 Field Aware Virtual Connection Discovery
6.0 Implementation Mechanisms—Hardware Overview
7.0 Extensions and Alternatives
1.0 Overview A method for field aware virtual connection discovery is described. In an embodiment, a set of virtual connection domains and a set of virtual connection connectors are determined from a network. Each of the virtual connection connectors defines a connection between two or more of the virtual connection domains. A particular virtual connection connecter is added to a virtual connection map. The particular virtual connection domains which are connected by the particular virtual connection connector are added to the virtual connection map.

In another embodiment, a set of virtual connection domains and a set of virtual connection connectors are determined from a network which supports Ethernet virtual connections. Each of the virtual connection connectors defines a connection between two or more of the virtual connection domains. An initial virtual connection connecter is selected and marked as unvisited. A packet is generated which represents the initial virtual connection connector. The following steps are performed for each particular virtual connection connector which is marked as unvisited. The particular virtual connection connector is added to a virtual connection map and marked as visited. The particular virtual connection domains which are connected by the particular virtual connection connector are added to the virtual connection map. A set of virtual connection connector exit points from the particular virtual connection domains through one or more virtual connection connectors which would accept the packet representing the particular virtual connection connector are selected. Each particular virtual connection connector which has not already been marked as visited is marked as unvisited. The packet is flooded through the set of virtual connection connector exit points and each virtual connector exit point applies its own one or more rules to create its own rewritten packet representing the virtual connector exit point.

In other embodiments, the invention encompasses a computer apparatus and a computer-readable medium configured to carry out the foregoing steps.

Embodiments generally provide a simple method for determining the Virtual Connections of a given network. Embodiments may monitor a variety of networks and be implemented on a variety of systems which provide, use, or analyze Virtual Connections. An example is Cisco Active Network Abstraction (ANA), commercially available from Cisco Systems, Inc., San Jose, Calif., and which supports network management systems by providing diagnostic information concerning Virtual Connections.

2.0 Virtual Connections Overview

In many cases, customers wish to be able to monitor the Virtual Connections to which they subscribe in order to detect problems should they occur. However, the Virtual Connections may only exist as a set of rules distributed over the various elements of a network which implements the Virtual Connection. Therefore, a centralized map indicating which Virtual Connections a given network implements or even which elements implement a particular Virtual Connection may not exist. Without such a map it is difficult for a customer to accurately monitor their Virtual Connections. Therefore, a discovery process is needed which can determine the Virtual Connections which are implemented by a given network.

FIG. 1 illustrates an example network upon which an embodiment may discover virtual connections. Customer VLAN 101 has UNI 106 and connects to service provider VLAN 100. Customer VLAN 103 has UNI 107 and connects to SP-VLAN 100 using Virtual Connection 110. Customer VLAN 104 has UNI 108 and connects to SP-VLAN 100. Customer VLAN 102 has UNI 105 and connects to SP-VLAN 100 using Virtual Connection 109. One problem that may arise when mapping Virtual Connections is that different Virtual Connections may share some of the same network elements or business elements. An example network where this could occur is illustrated by FIG. 1 in which Virtual Connection 109 and Virtual Connection 110 both pass through SP-VLAN 100.

In one embodiment, a discovery process may take into account only the base connectivity of the elements of the network. In such a case, the discovery process may assume that since CE-VLANs 101, 102, 103, 104 all connect to SP-VLAN 100, all the CE-VLANs are capable of communicating with each other. Since Virtual Connections are typically defined by UNIs which are capable of communicating with each other, the discovery process may erroneously merge Virtual Connection 109 and Virtual Connection 110 into one large Virtual Connection.

However, the elements of the service provider network may implement one or more rules which provide a mechanism that allows the service provider network to distinguish between traffic belonging to different Virtual Connections. For example, traffic that comes from a particular CE-VLAN may be tagged with a particular identifier upon entering the service provider network. The service provider network may then use that identifier to route traffic only to other CE-VLANs which are part of the same Virtual Connection. Therefore, in an embodiment, a discovery process which can take into account the mechanisms a service provider network implements, to distinguish between traffic belonging to different Virtual Connections, may generate more accurate Virtual Connection maps.

3.0 Virtual Connection Connectors

In an embodiment, a network supporting virtual connections can have the network elements or business elements belonging to the network represented in stored data as a collection of Virtual Connection Connectors (VCC) and Virtual Connection Domains (VCD).

In some embodiments, a VCC defines a connection between two or more VCDs. However, in other embodiments a VCC may define a connection between a static number of VCDs, such as two VCDs.

A VCC acts as a gateway facilitating the flow of information between the VCDs which the VCC connects. In some embodiments, each VCC may have exclusive control over the flow of information between the VCDs which the VCC connects. However, in other embodiments, a VCC may not have exclusive control of the flow of information between the VCC it connects. For example, if an embodiment permits, two different VCCs may define a connection between the same VCDs. Information would then be able to flow from one VCD to another through either of the VCCs that connect the VCDs.

In some embodiments the information may take the form of packets or frames adhering to any number of potential standards. In an embodiment, the information may take the form of Ethernet frames adhering to the IEEE 802.1Q standard as defined in "IEEE Standard for Local and Metropolitan Area Networks," 2005, the entire contents of which are hereby incorporated by reference for all purposes as if fully set forth herein. In other embodiments, the information may take the form of Internet Protocol packets. However, the particular form that the information takes is not critical.

From this point forward the information flowing between the VCDs will be referred to as packets. However, the term "packets" is used solely for the purpose of convenience and is not intended in any way to limit the techniques described herein to any particular standard.

Each VCC may define one or more rules indicating how the VCC will handle packets arriving at the VCC. In some embodiments the rules may fall into one of two categories, "Match Criteria" or "Rewrite Command".

3.1 Match Criteria

Match Criteria defines the matching rules for any packet attempting to enter the VCC. If the packet matches the rules set forth in the Match Criteria then the VCC will forward the packet. In some embodiments, the VCC will contain forwarding information which indicates how the VCC should forward packets which match the Match Criteria. If the packet does not match the rules set forth in the Match Criteria the VCC may take one or more default actions. In an embodiment, a default action is to drop the packet.

In some embodiments, each VCC may define more than one Match Criteria. In such cases, some embodiments may require a packet to meet each Match Criteria in order to pass. However, other embodiments might allow a packet to pass through the VCC if the packet matches one or more of the Match Criteria. In still other embodiments, the VCC may have forwarding information that indicates how to forward the packet based on which Match Criteria rules the packet was able to meet.

In some embodiments, a VCC may define Match Criteria which matches any packet. In other embodiments, a VCC may define Match Criteria which matches no packet.

As an example, Match Criteria for a packet adhering to the 802.1Q standard might require packets to have a field with a VLAN tag indicating a particular VLAN, a VLAN range, or a list of VLANs. In other cases, the Match Criteria might indicate that the packet must have no tags in order to enter, must be double tagged with two specific VLANs, or have a specific Class of Service (CoS) value. In other embodiments, the Match Criteria may make use of any field of a standard to which the packet adheres.

3.2 Rewrite Commands

A "Rewrite Command" is a rule which rewrites a packet which enters the VCC. In some embodiments, the Rewrite Command may modify or overwrite a particular field or plurality of fields within the packet. However, other embodiments may also allow a VCC to add a field, delete a field, or shift values from one field to another. In some embodiments, a VCC may even extract some or all of the values of the fields contained within the packet and repackage or encapsulate that data into another packet adhering to a different standard. In still other embodiments, a VCC may define a Rewrite Command which makes no changes to the packet.

In some embodiments each VCC will contain only a single Rewrite Command for all packets which enter the VCC. However, other embodiments may allow VCCs to define multiple Rewrite Commands which can be applied depending on the packet entering the VCC. For example, an embodiment might allow a VCC to define multiple Match Criteria and multiple Rewrite Commands. The VCC may then perform a particular Rewrite Command only if the packet matches a particular Match Criteria. However, other embodiments may have matching rules independent from the Match Criteria that indicate which Rewrite Commands to apply based on a given packet.

As an example, for a packet adhering to the 802.1Q standard, a Rewrite Command can manage the VLAN tags of the packet by popping a VLAN tag off of the packet, pushing a VLAN tag onto the packet, or changing a VLAN tag value within the packet. In other cases, the VCC may pop, push, or modify multiple tags at once. In other embodiments, Rewrite Commands may make use of any field of a standard to which the packet adheres.

3.3 Bi-Directionality

In some embodiments, a VCC may define different rules depending on the direction a packet is traveling. For example, assume a VCC connects first and second VCDs denoted VCD1 and VCD2. The VCC may define one set of rules for packets traveling from VCD1 to VCD2 through the VCC. However, the VCC may define a second set of rules that is different from the first set of rules for packets traveling from VCD2 to VCD1 through the same VCC.

In some embodiments, a VCC may be bi-directional. A VCC is bi-directional when the VCC defines a set of rules for a packet traveling in one direction and an opposite set of rules for a packet traveling in the opposite direction.

Figure 2:
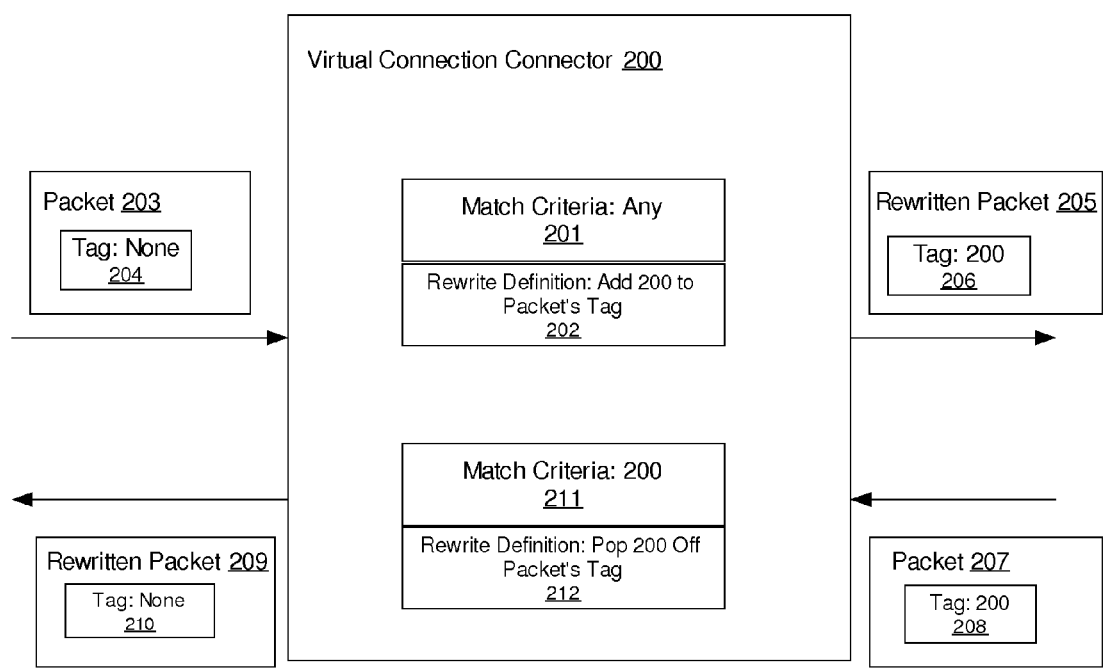
FIG. 2 illustrates an embodiment of a Virtual Connection Connector.

FIG. 2 illustrates an embodiment of a Virtual Connection Connector. In an embodiment, Virtual Connection Connector 200 comprises first Match Criteria 201 associated with Rewrite Definition 202 and second Match Criteria 211 associated with Rewrite Definition 212. FIG. 2 also represents data flow in the sense that packet 203 comprising tag 204 is received at VCC 200 and after applying match criteria and performing rewriting results in Rewritten Packet 205 with tag 206. Similarly a second inbound packet 207 comprising tag 208 is applied to match criteria and rewritten into Rewritten Packet 209 with tag 210.

One example of a bi-directional VCC is illustrated by FIG. 2. Packet 203 with no tag enters the VCC 200 from a first direction and is submitted to Match Criteria 201 which matches any packet and Rewrite Command 202 which pushes a 200 tag onto a packet. Since Packet 203 matches Match Criteria 201, Rewrite Command 202 is applied to push a 200 tag onto Packet 203 creating Rewritten Packet 205.

However, Packet 207 containing a 200 tag which arrives from the opposite direction has the opposite rules applied to it. Packet 207 is subjected to Match Criteria 211 which checks for a packet with a 200 tag and Rewrite Command 212 which pops the 200 tag off of a packet. Since Packet 207 matches Match Criteria 211, the Rewrite Command 212 removes the 200 tag from Packet 207 creating Rewritten packet 209.

In some embodiments, each VCC must be bi-directional. In addition, some embodiments may further limit VCCs by requiring each VCC to only define one Match Criteria and one Rewrite Command for each direction.

3.4 Example Virtual Connection Connector Components

The following description provides examples of network and business elements which VCCs may represent. However, these examples are not exclusive and are included merely to clearly illustrate the concept of a VCC as applied in some embodiments. In addition, the rules extracted from each of the example elements may potentially be grouped into more than one VCC.

In some embodiments, the Virtual Connections within the network may represent EVCs and the VCCs may represent elements which are Ethernet Flow Points (EFP). An EFP is a forwarding decision point in a service provider equipment router, which gives network designers flexibility to make many Layer 2 flow decisions within the interface itself. Many EFPs can be configured on a single physical port of the router. In some respects, an EFP can act as a virtual port on the device. In some embodiments, an EVC that connects two or more User Network Interfaces (UNIs) may contain an EFP on the associated ingress and egress interfaces of every device that the EVC passes through. In other embodiments, the VCCs within the network may represent elements which are Pseudowire Edges. A Pseudowire is an emulation of a layer 2 point-to-point connection-oriented service over a packet-switching network. The Pseudowire emulates the operation of a "transparent wire" carrying the service. In some embodiments, the service being carried over the "wire" may be Asynchronous Transfer Mode (ATM), Packet Relay, Ethernet, or Time-division multiplexing while the packet network may be Multi-protocol label switching (MPLS), Internet Protocol (IPv4 or IPv6), or Layer 2 Tunneling Protocol Version 3 (L2TPv3). One standard for Pseudowires, is defined in "Pseudo Wire Emulation Edge to Edge (PWE3) Architecture", 2005 by The Internet Society the entire contents of which are hereby incorporated by reference for all purposes as if fully set forth herein. In some embodiments, a Pseudowire Edge is the element which allows access to a Pseudowire.

4.0 Virtual Connection Domains

A VCD is the logical representation of network or business elements that are connected by one or more VCCs. In some embodiments, the elements which comprise a VCD do not define any kind of Match Criteria or Rewrite Command. In such embodiments, a VCC which defines either Match Criteria or Rewrite Commands denotes a boundary of the VCD.

In other embodiments, a VCD may contain elements which define Match Criteria, but not Rewrite Commands. In such embodiments, a VCC which performs Rewrite Commands denotes a boundary of a VCD.

In still other embodiments, the elements which comprise a VCD may define both Match Criteria and Rewrite Commands; however the Rewrite Commands may modify fields different than those defined by the Rewrite Commands of the attached VCCs. For example, assuming a packet adhering to the 802.1Q standard, a VCC may modify, push, or pop the VLAN tags of a packet, where the elements of the VCD may modify other fields of the packet such as source or destination MAC address. In such an embodiment, a VCC which defines the specific category of Rewrite Commands denotes a boundary of a VCD. Further, in an embodiment, the fields may be chosen based on the fields that a network uses to distinguish between Virtual Connections.

4.1 Example Virtual Connection Domain Components

In order to aid in understanding VCDs, the following description provides examples of network and business elements which VCDs may represent. However, these examples are not exclusive and are included merely to clearly illustrate the concept of a VCD as applied in certain embodiments.

In some embodiments, a VCD may represent elements which are Virtual Local Area Networks (VLANs). A VLAN is sometimes defined as a group of network elements with a common set of requirements that communicate as if they were attached to the same broadcast domain, regardless of their physical location. A VLAN will typically have the same attributes as a physical local area network, but it allows for end stations to be grouped together even if they are not located on the same network switch. In many cases, VLAN membership can be configured through software instead of physically relocating devices or connections. In some embodiments, packets belonging to a particular VLAN will be "tagged" with an identifier indicating a particular VLAN. One example of a standard for VLANs as they are used by some networks which implement EVCs, can be found in the IEEE 802.1Q standard described by "IEEE Standard for Local and Metropolitan Area Networks—Virtual Bridged Local Area Networks", 2006 the entire contents of which are hereby incorporated by reference for all purposes as if fully set forth herein.

In some embodiments, a VCD may represent elements which are Virtual Private Local Area Network Services (VPLSs). A VPLS is a way to provide Ethernet based multipoint to multipoint communication over IP/MPLS networks. A VPLS allows geographically dispersed sites to share an Ethernet broadcast domain by connecting sites through Pseudowires.

In some embodiments, a VCD may represent elements which are Local Connects. Local Connects represent local switching entries. Local switching allows switching of Layer 2 data between two attachment circuits on the same device. In local switching (also known as hairpin connection), packets from one attachment circuit are switched to another attachment circuit on the same network device. The local switching acts as a kind of tube between the two interfaces.

In some embodiments, a VCD may represent elements which are Bridge Domains. A Bridge Domain creates a Layer 2 broadcast domain spanning a set of physical or virtual ports internal to a device. In some embodiments, packets are switched within a bridge domain based on their destination MAC address. In other embodiments, packets may be flooded within the bridge domain if the MAC address specifies the packet is meant for broadcast or multicast. In addition, in some embodiments Bridge Domains may use EFPs as the virtual ports which the bridge domain spans.

In some embodiments, a VCD may represent elements which are Pseudowires such as those discussed above in reference to Psuedowire Edges.

In some embodiments, a VCD may represent elements which are Links. A Link represents a topological connection between two physical or virtual ports residing on different network devices. In some embodiments, the virtual ports connected by a Link may be EFPs.

5.0 Field Aware Virtual Connection Discovery

Figure 3A:
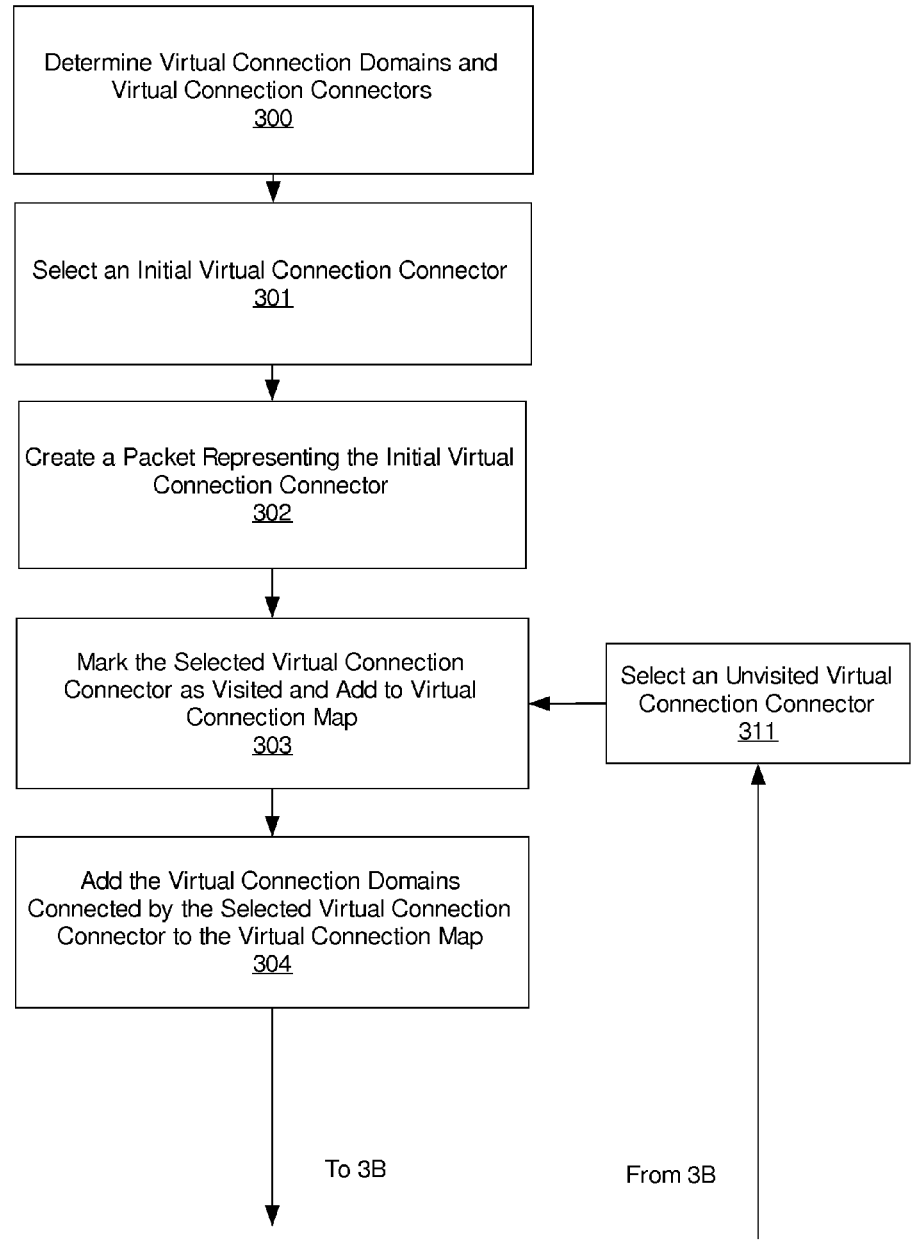
FIG. 3A and FIG. 3B illustrate an embodiment of the Virtual Connection discovery process in block diagram form.
Figure 3B:
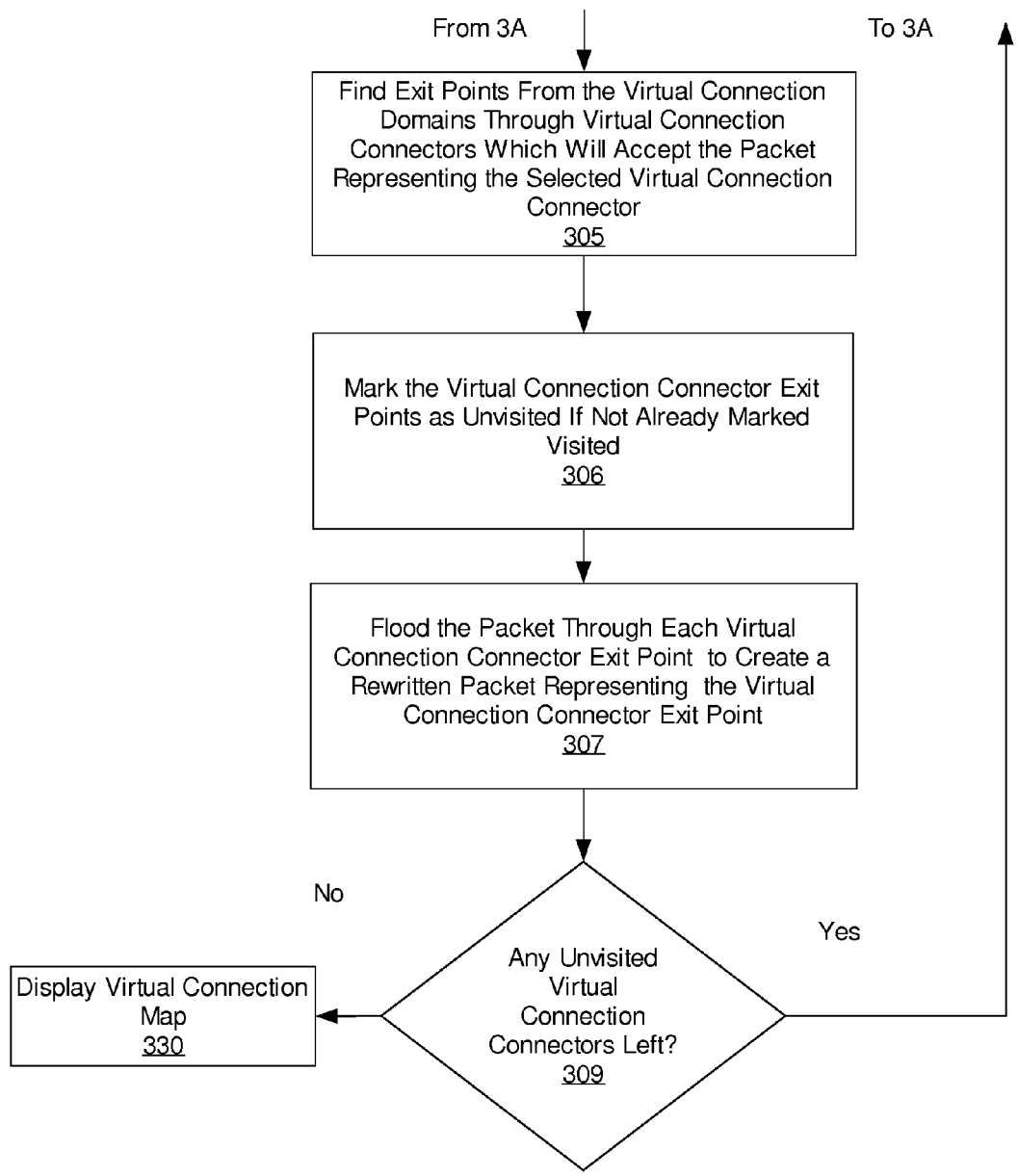

FIG. 3A and FIG. 3B illustrate an embodiment of the Virtual Connection discovery process in block diagram form. Various other embodiments may implement the processes disclosed herein using processing steps or functional blocks that are ordered differently than any order specified or implied herein for a particular embodiment.

At block 300, the VCDs and VCCs for a particular network are determined. In some embodiments, determining the VCDs and VCCs for a particular network involves creating a virtual representation of the network and grouping the network and business elements of the network into individual VCDs and VCCs. In some embodiments, the determining may first begin by finding the network elements. In such an embodiment, the network elements may then be transformed into a collection of business elements which in turn may be grouped into a collection of VCDs and VCCs. Alternatively, the network elements may be transformed directly into VCDs and VCCs without determining which, if any, business elements the network elements may implement.

Figure 4:
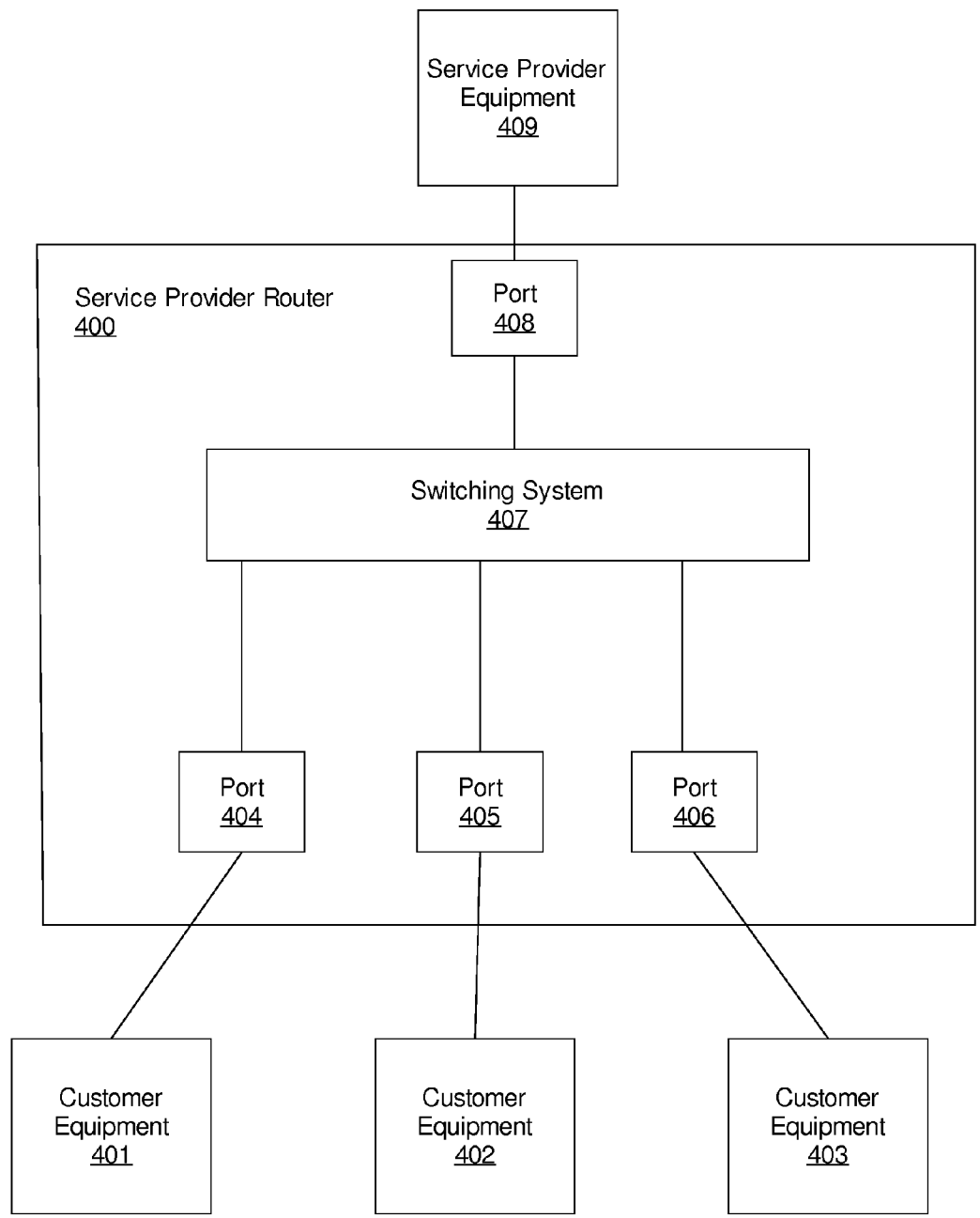
FIG. 4 illustrates an embodiment of a physical layout of a network around a service provider router.
Figure 5:
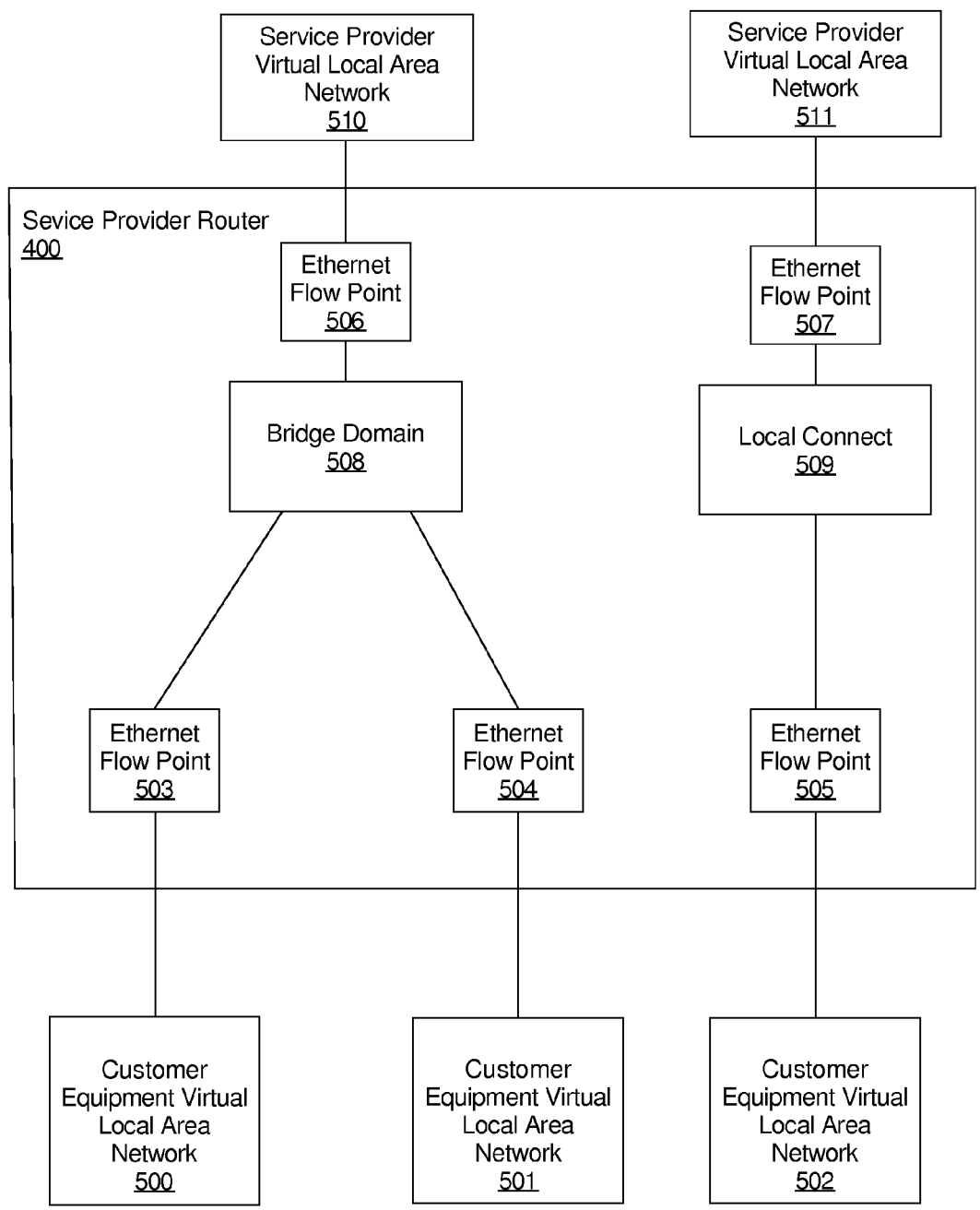
FIG. 5 illustrates an embodiment of a logical layout which could be implemented on the service provider router of FIG. 4.
Figure 6:
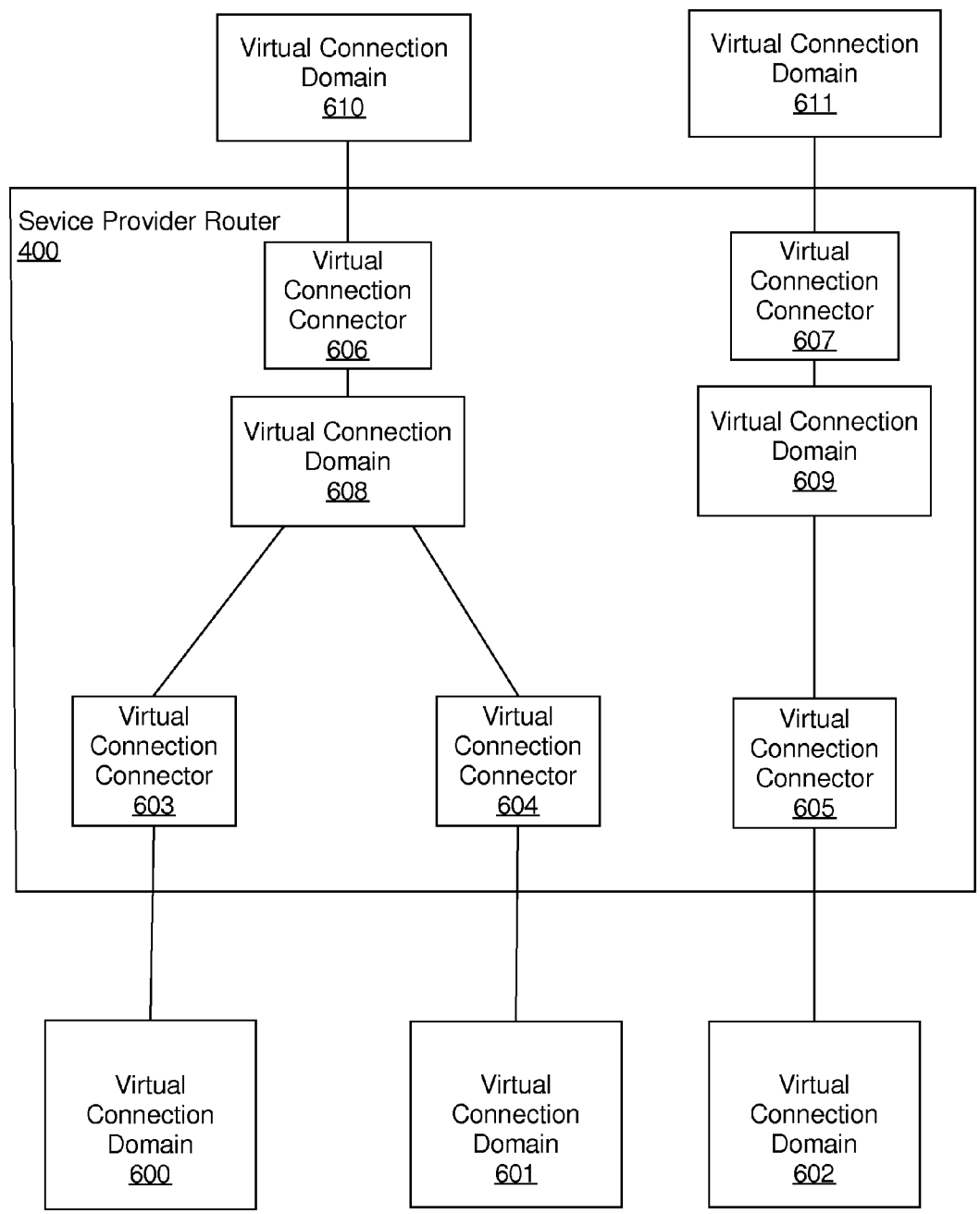
FIG. 6 illustrates an embodiment of a collection of Virtual Connection Connectors and Virtual Connection Domains which could be implemented on the logical layout of FIG. 5.

FIG. 4 illustrates an embodiment of a physical layout of a network around a service provider router. FIG. 5 illustrates an embodiment of a logical layout which could be implemented on the service provider router of FIG. 4. FIG. 6 illustrates an embodiment of a collection of Virtual Connection Connectors and Virtual Connection Domains which could be implemented on the logical layout of FIG. 5. In general, FIG. 4, FIG. 5, FIG. 6 illustrate a sample embodiment where the network elements of a router are first transformed into business elements which are then grouped into VCCs and VCDs. The examples provided are intended only to serve as an illustration and are not intended to limit block 300 or any other step to the particular embodiment described. Also note that the examples display only a portion of a network which may in fact be significantly larger.

FIG. 4 illustrates a service provider router 400. Router 400 comprises four ports, 404, 405, 406 and 408 which are interconnected by a switching system 407. Furthermore, the router 400 is connected to service provider equipment 409 and to customer equipment 401, 402, 403 through the four ports. However, the displayed network elements in this example only represent the physical layout of the network. Many different types of logical structures may be implemented on the displayed network elements.

FIG. 5 illustrates a sample embodiment which displays one possible collection of business elements which may be implemented by the network elements of FIG. 5. The four ports of service provider router 400 and shown in FIG. 4 as ports 404, 405, 406, and 408 are represented in FIG. 5 by EFPs 503, 504, 505, 506, and 507. Port 408 of FIG. 4 is represented in FIG. 5 by EFP 506 and EFP 507, the two virtual ports which reside on Port 408. In addition, the switching system 407 of FIG. 4 is represented in FIG. 5 by a Bridge Domain 508 and a Local Connect 509 in order to accurately represent the connectivity between the EFPs. Furthermore, the customer equipment 401, 402, 403, and service provider equipment 409 are now represented by the corresponding VLANs 500, 501, 502, 510, and 511 to which that equipment belonged. Since in this example service provider equipment 409 took part in two different SP-VLANs, service provider equipment 409 is represented by both SP-VLAN 510 and and SP-VLAN 511.

FIG. 6 illustrates a sample embodiment which displays one possible grouping of the business elements of FIG. 6 into VCCs and VCDs. Specifically, the EFPs 503, 504, 505, 506, and 507 of FIG. 5 are represented in FIG. 6 by VCCs 603, 604, 605, and 607 and the Bridge Domain 508, Local Connect 509, and VLANs 500, 501, 502, 510, and 511 of FIG. 5 are represented in FIG. 6 by VCDs 608, 609, 500, 601, 602, 610 and 611.

Referring again to FIG. 3A, at block 301, an initial VCC is selected. In some embodiments, a particular VCC may be selected by a user. In other embodiments, a VCC may be selected based at least in part upon the Match Criteria or Rewrite Command the VCC defines. In such embodiments, the VCC may be selected based on the number or complexity of the rules that the VCC defines. In some embodiments, the VCC selected will be the VCC which defines the most specific rules. In some cases, the most specific rules may be the most numerous, the most complex, or define criteria which may most limit the other VCCs which would accept packets representing the rules. However, the criteria for selecting the VCC with the most specific rules may vary from implementation to implementation. In still other embodiments, the initial VCC may be selected based on the proximity or inclusion within a particular customer's network.

At block 302, a packet is created which represents the initially selected VCC. In some embodiments, the packet will be constructed such that the Match Criteria rules for the VCC will accept that packet. In other cases, if the VCC defines multiple Match Criteria, multiple packets may be generated at block 302 in order to cover each type of packet the VCC may accept. In still other embodiments, one or more packets may be generated for each direction a packet may be capable of passing through the VCC. In such cases, an embodiment may keep track of which direction each one of those packets belongs to. In some embodiments, the packet created is a pseudo-packet within a virtual representation of the network.

Furthermore, in some embodiments the packet representing the selected VCC may be subsequently subjected to the Rewrite Commands of the selected VCC, creating a modified packet in order to simulate the packet first passing through the selected VCC. In such embodiments, the modified packet may become the packet which represents the selected VCC.

At block 303, the selected VCC is marked as visited and added to a virtual connection map. In some embodiments, the map may be represented by a data structure and adding a VCC as well as marking a VCC as visited may involve changing a value in the same data structure. In other cases, the marking may occur in a data structure that is separate from the data structure representing the virtual connection map. However, the specific techniques used to store the virtual connection map and the markings are not critical. In some embodiments, block 303 will only add a VCC to the virtual connection map if the VCC is marked as unvisited or has not already been added to the virtual connection map.

At block 304, the VCDs which are connected by the selected VCC are added to the virtual connection map. In some embodiments, adding the VCDs to the virtual connection map may involve adding, updating, or deleting fields or objects within the data structure. For example, an embodiment may represent the VCDs and VCCs as a graph of nodes and links. Depending on whether the VCDs are represented as the nodes or the links, adding VCDs may involve adding the corresponding object and updating the data structure accordingly.

Referring now to FIG. 3B, block 305, VCC exit points from the VCDs through VCCs which will accept the packet representing the selected VCC are found. In some embodiments, VCC exit points may be found by checking whether each VCC connected by the VCDs will accept the packet. If a VCC will accept the packet, then that VCC is considered a VCC exit point. In other embodiments, only a subset of the VCCs connected by the VCDs may be checked. For example, an embodiment may check only VCCs which are not already marked as visited.

In some embodiments, a VCC accepts the packet when the packet meets the Match Criteria for the VCC. If the selected VCC is represented by multiple packets, an embodiment may repeat block 305 for each packet. If the selected VCC is represented by packets belonging to particular directions, an embodiment may check a VCCs acceptance of a packet only for VCCs accessible through the VCD belonging to the particular direction of that packet.

At block 306, The VCC exit points are marked as unvisited if not already marked as visited. In some embodiments, a VCC being marked as visited may signify that the VCC was the selected VCC during a previous iteration or currently is the selected VCC. As such, an unvisited VCC may represent a VCC that was found at block 305, but not yet selected at block 311. Depending on the configuration of the network one or more VCC exit points found at block 305 may have already been selected and marked as visited. Thus, block 306 prevents a VCC from being selected again at block 311. Alternatively, block 306 may be modified to mark all VCC exit points as unvisited regardless status. One case where block 306 may be modified is when steps have previously been taken to ensure that only VCCs not marked as visited are found as VCC exit points at block 305.

At block 307, the packet is flooded through each VCC exit point and each VCC exit point applies its own Rewrite Commands to the packet in order to create a rewritten packet which represents that VCC exit point. In some embodiments, the flooding creates and sends a copy of the packet to each VCC exit point discovered for that packet. In other embodiments, the flooding is performed on a virtual representation of the network which simulates a packet being sent to each VCC exit point. In still other embodiments, if multiple packets were accepted by a VCC exit point at block 305, the VCC exit point may be represented by multiple rewritten packets.

At block 308, it is determined whether any VCCs marked as unvisited remain.

If there are still unvisited VCCs, a VCC is selected from among the unvisited VCCs at block 311 (FIG. 3A) and the steps represented by blocks 303-308 are repeated using the newly selected VCC. In some embodiments, the unvisited VCC may be selected at random. In other embodiments, the unvisited VCC will be selected by a user. In still other cases, the unvisited VCC may be selected based on the Match Criteria or Rewrite Command rules the unvisited VCCs define.

If at block 308 there are not any VCCs left marked as unvisited, the virtual connection map can be displayed at block 310. The resulting map represents all the VCDs and VCCs which a packet could potentially access through the initially selected VCC. As such, the map represents the particular Virtual Connection to which the initially selected VCC belongs. In some embodiments, rather than displaying the virtual connection map, the map may instead be stored for later analysis or display.

In some embodiments, displaying the virtual connection map displays the VCDs and VCCs belonging to the map. However, other embodiments may break down the VCDs and VCCs into their corresponding network or business elements and display those elements instead. In still other embodiments, the display may include a mix of VCDs, VCCs, network elements, and business elements. In such embodiments, the display may give users the option of breaking the VCDs and VCCs down into their component business and network elements.

In some cases, a user might wish to discover all of the Virtual Connections in the network rather than the Virtual Connection to which a particular VCC belongs.

In an alternative embodiment, a record of all the VCCs discovered in block 300 which have not been marked visited by the end of the discovery process can be maintained. The unmarked VCCs are the VCCs which have not been considered by the discovery process since they have no connectivity to the initially selected VCC. In such an embodiment, it is possible to rerun the discovery process selecting one of the unmarked VCCs as the initial VCC and adding the VCCs and VCDs encountered to a different virtual connection map. If this process is repeated until no unmarked VCCs remain, the collection of virtual connection maps generated will represent all the virtual connections of the network. In other alternative embodiments, the VCCs and VCDs encountered may be added to the same virtual connection map, however they may be provided with an identifier to distinguish between the different Virtual Connections contained within the map.

In another embodiment, a Virtual Connection may be compared against one or more other discovered Virtual Connections in order to determine if the Virtual Connection is a subset of another Virtual Connection. In some embodiments, a first Virtual Connection is a subset of a second Virtual Connection when all the components of the first Virtual Connection are also found in the second Virtual Connection. In such embodiments, Virtual Connections which are subsets of other Virtual Connections may be removed.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
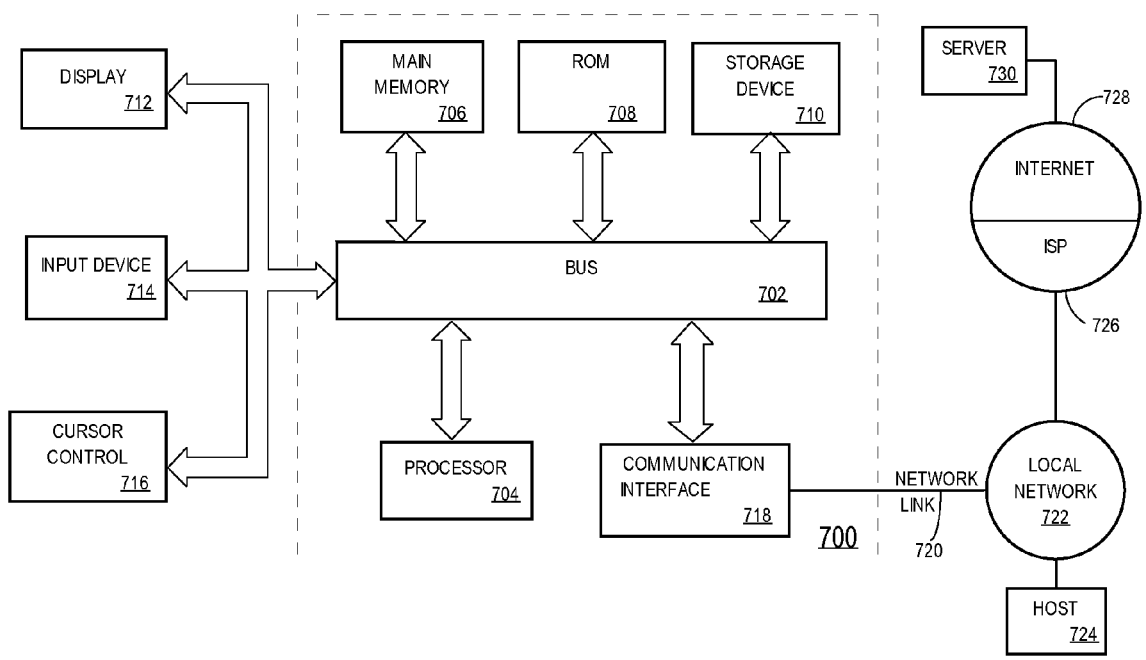
FIG. 7 illustrates a computer system upon which an embodiment could be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

determining a set of virtual connection domains and a set of virtual connection connectors based on a network upon which one or more virtual connections are configured, wherein each of the virtual connection connectors defines a connection between two or more of the virtual connection domains, one or more rules for accepting packets, and one or more rules for rewriting packets, wherein the one or more virtual connections are already existing virtual connections configured on the network;

selecting an initial virtual connection connector of the set of virtual connection connectors;

adding the initial virtual connection connector to a virtual connection map in association with a first virtual connection of the one or more virtual connections;

wherein the virtual connection map comprises a graph of nodes and links;

exploring the network, starting from the initial virtual connection connector, and adding encountered virtual connection domains of the set of virtual connection domains and encountered virtual connection connectors of the set of virtual connection connectors to the virtual connection map in association with the first virtual connection, by at least:

generating a packet that represents the initial virtual connection connector and flooding the packet through the network starting at the initial virtual connection connector, determining that a virtual connection connector is encountered and added to the virtual connection map when the one or more rules for accepting packets of the virtual connection connector accepts the packet and, when the packet passes through the virtual connection connector, the virtual connection connector applies the one or more rules for rewriting packets of the virtual connection connector to the packet;

repeating the generating and determining to update the virtual connection map until all virtual connection connectors in the network are visited, and in response to determining until all virtual connection connectors in the network are visited, displaying the virtual connection map;

wherein the method is performed by one or more digital electronic processors.

2. The method of Claim 1 wherein at least one virtual connection connector of the set of virtual connection connectors defines a rule for rewriting packets which applies no changes.

3. The method of Claim 1 wherein at least one virtual connection connector of the set of virtual connection connectors defines a rule for accepting packets which accepts all packets.

4. The method of Claim 1, wherein each virtual connection domain in the set of virtual connection domains represents one of a VPLS, a SP/CE VLAN, a Local Connect, a Bridge Domain, a Single Segment PseudoWire, a Multi Segment PseudoWire, or a Link;

wherein each virtual connection connector in the set of virtual connection connectors is determined from one of a Ethernet Flow Point, or a Pseudowire Edge.

5. The method of Claim 1 wherein the packet is a pseudo packet and the flooding is performed by simulating the packet flooding through the network.

6. The method of Claim 1 wherein each virtual connection connector of the set of virtual connection connectors defines a bidirectional connection between two virtual connection domains of the set of virtual connection domains and defines opposite rewrite rules for each direction.

7. The method of Claim 1 wherein generating the packet which represents the initial virtual connection connector creates a packet which the initial virtual connection connector would accept.

8. The method of Claim 1, wherein flooding the packet is performed by at least:

identifying virtual connection domains of the set of virtual connection domains that are adjacent to the initial virtual connection connector;

adding the virtual connection domains to the virtual connection map in association with the first virtual connection;

identifying a set of virtual connection exit points of the set of virtual connection connectors that are adjacent to the virtual connection domains and are configured to accept the packet;

adding the set of virtual connection exit points to the virtual connection map in association with the first virtual connection;

flooding the packet through the set of virtual connection exit points and applying the one or more rules for rewriting packets of each virtual connection exit point of the set of virtual connection exit points as the packet passes through the virtual connection exit point.

9. The method of Claim 1, further comprising:

in response to detecting that the packet has completed flooding the network, selecting a new initial virtual connection connector of the set of virtual connection connectors that is not a member of the encountered virtual connection connectors;

adding the new initial virtual connection connector to the virtual connection map in association with a second virtual connection;

exploring the network, starting from the new initial virtual connection connector, and adding second encountered virtual connection domains of the set of virtual connection domains and second encountered virtual connection connectors of the set of virtual connection connectors to the virtual connection map in association with the second virtual connection, by at least:

generating a second packet that represents the new initial virtual connection connector and flooding the second packet through the network, wherein, a second virtual connection connector is encountered when the one or more rules for accepting packets of the second virtual connection connector accepts the second packet and, when the second packet passes through the second virtual connection connector, the second virtual connection connector applies the one or more rules for rewriting packets of the second virtual connection connector to the second packet.

10. The method of Claim 9, wherein the packet has completed flooding the network when no additional virtual connection domains of the set of virtual connection domains or additional virtual connection connectors of the set of virtual connection connectors that have not already been encountered can be encountered by the packet.

11. The method of Claim 1, wherein each virtual connection of the one or more virtual connections is an Ethernet virtual circuit.

12. The method of Claim 1 wherein at least two of the virtual connection domains are coupled by a virtual connection connector in the network and the at least two virtual connection domains are separate from the virtual connection connector.

13. The method of Claim 1 wherein the flooding the packet through the network comprises:

creating, for each virtual connection connector coupled by the network to the initial virtual connection connector, copies of the packet;

transmitting, to each virtual connection connector coupled by the network to the initial virtual connection connector, a copy of the packet.

14. A non-transitory computer-readable medium carrying one or more sequences of instructions, which when executed by one or more processors, cause the one or more processors to carry out the steps of:

determining a set of virtual connection domains and a set of virtual connection connectors based on a network upon which one or more virtual connections are configured, wherein each of the virtual connection connectors defines a connection between two or more of the virtual connection domains, one or more rules for accepting packets, and one or more rules for rewriting packets, wherein the one or more virtual connections are already existing virtual connections configured on the network;

selecting an initial virtual connection connector of the set of virtual connection connectors;

adding the initial virtual connection connector to a virtual connection map in association with a first virtual connection of the one or more virtual connections;

wherein the virtual connection map comprises a graph of nodes and links;

exploring the network, starting from the initial virtual connection connector, and adding encountered virtual connection domains of the set of virtual connection domains and encountered virtual connection connectors of the set of virtual connection connectors to the virtual connection map in association with the first virtual connection, by at least:

generating a packet that represents the initial virtual connection connector and flooding one or more copies of the packet through the network starting at the initial virtual connection connector;

determining that a virtual connection connector is encountered and added to the virtual connection map when the one or more rules for accepting packets of the virtual connection connector accepts the packet and, when the packet passes through the virtual connection connector, the virtual connection connector applies the one or more rules for rewriting packets of the virtual connection connector to the packet;

repeating the generating and determining to update the virtual connection map until all virtual connection connectors in the network are visited, and in response to determining until all virtual connection connectors in the network are visited, displaying the virtual connection map.

15. The non-transitory computer readable medium of Claim 14 wherein at least one virtual connection connector of the set of virtual connection connectors defines a rule for rewriting packets which applies no changes.

16. The non-transitory computer readable medium of Claim 14 wherein at least one virtual connection connector of the set of virtual connection connectors defines a rule for accepting packets which accepts all packets.

17. The non-transitory computer readable medium of Claim 14, wherein each virtual connection domain in the set of virtual connection domains represents one of a VPLS, a SP/CE VLAN, a Local Connect, a Bridge Domain, a Single Segment PseudoWire, a Multi Segment PseudoWire, or a Link; wherein each virtual connection connector in the set of virtual connection connectors is determined from one of a Ethernet Flow Point, or a Pseudowire Edge.

18. The non-transitory computer readable medium of Claim 14, wherein the packet is a pseudo packet and the flooding is performed by simulating the packet flooding through the network.

19. The non-transitory computer readable medium of Claim 14, wherein each virtual connection connector of the set of virtual connection connectors defines a bidirectional connection between two virtual connection domains of the set of virtual connection domains and defines opposite rewrite rules for each direction.

20. The non-transitory computer readable medium of Claim 14, wherein generating the packet which represents the initial virtual connection connector creates a packet which the initial virtual connection connector would accept.

21. The non-transitory computer-readable medium of Claim 14, wherein flooding the packet is performed by at least:

identifying virtual connection domains of the set of virtual connection domains that are adjacent to the initial virtual connection connector;

adding the virtual connection domains to the virtual connection map in association with the first virtual connection;

identifying a set of virtual connection exit points of the set of virtual connection connectors that are adjacent to the virtual connection domains and are configured to accept the packet;

adding the set of virtual connection exit points to the virtual connection map in association with the first virtual connection;

flooding the packet through the set of virtual connection exit points and applying the one or more rules for rewriting packets of each virtual connection exit point of the set of virtual connection exit points as the packet passes through the virtual connection exit point.

22. The non-transitory computer-readable medium of Claim 14, wherein the steps further comprise:

in response to detecting that the packet has completed flooding the network, selecting a new initial virtual connection connector of the set of virtual connection connectors that is not a member of the encountered virtual connection connectors;

adding the new initial virtual connection connector to the virtual connection map in association with a second virtual connection;

exploring the network, starting from the new initial virtual connection connector, and adding second encountered virtual connection domains of the set of virtual connection domains and second encountered virtual connection connectors of the set of virtual connection connectors to the virtual connection map in association with the second virtual connection, by at least:

generating a second packet that represents the new initial virtual connection connector and flooding the second packet through the network, wherein, a second virtual connection connector is encountered when the one or more rules for accepting packets of the second virtual connection connector accepts the second packet and, when the second packet passes through the second virtual connection connector, the second virtual connection connector applies the one or more rules for rewriting packets of the second virtual connection connector to the second packet.

23. The non-transitory computer-readable medium of Claim 22, wherein the packet has completed flooding the network when no additional virtual connection domains of the set of virtual connection domains or additional virtual connection connectors of the set of virtual connection connectors that have not already been encountered can be encountered by the packet.

24. The non-transitory computer-readable medium of Claim 14, wherein each virtual connection of the one or more virtual connections is an Ethernet virtual circuit.

* * * * *